United States Patent
Nalawadi et al.

(10) Patent No.: US 7,281,146 B2
(45) Date of Patent: Oct. 9, 2007

(54) DYNAMIC POWER REQUIREMENT BUDGET MANAGER

(75) Inventors: Rajeev K. Nalawadi, Folsom, CA (US); Mark P. Van Deusen, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 467 days.

(21) Appl. No.: 10/882,549

(22) Filed: Jun. 30, 2004

(65) Prior Publication Data

US 2006/0005057 A1 Jan. 5, 2006

(51) Int. Cl.
G06F 1/00 (2006.01)
G06F 1/26 (2006.01)
G06F 1/30 (2006.01)
G06F 1/32 (2006.01)

(52) U.S. Cl. ............... 713/320; 713/321; 713/323; 713/324; 713/340

(58) Field of Classification Search ............ 713/320, 713/321, 323, 324, 340
See application file for complete search history.

(56) References Cited

U.S. PATENT DOCUMENTS

| 6,222,347 B1* | 4/2001 | Gong ............... 320/137 |
| 6,243,817 B1* | 6/2001 | Melo et al. ........... 713/300 |
| 2005/0055588 A1 | 3/2005 | Nalawadi et al. |
| 2005/0262364 A1* | 11/2005 | Diab et al. ........... 713/300 |

* cited by examiner

*Primary Examiner*—Rehana Perveen
*Assistant Examiner*—Michael J. Brown
(74) *Attorney, Agent, or Firm*—Blakely, Sokoloff, Taylor & Zafman LLP

(57) ABSTRACT

A system and method to determine a presence of devices coupled to one a more peripheral buses in a system, and dynamically reducing power consumption of a subset of the devices that are present, based on correlating application/device association and a predetermined power source budget. In one embodiment, the reducing of the power consumption is performed dynamically by having an agent reduce the power limit in a device register(s) corresponding to the subset of devices. Furthermore, in one embodiment, the power resource budget is based at least in part on a user-selected power/performance level.

28 Claims, 4 Drawing Sheets

DYNAMIC POWER REQUIREMENT BUDGET MANAGER

FIELD OF INVENTION

The field of invention relates power management, and in particular, to the dynamic power budget manager for devices on a peripheral bus that supports dynamic device power allocation.

BACKGROUND

With today's mobile computers and client systems, extension of battery life and conservation of electrical demands on power supply has become a priority. However, extending the battery life and conservation of power of a mobile computer/client system has become more challenging. High powered processors, circuits, devices and displays provided in today's mobile computers/client systems consume more power than ever before. In order to achieve maximum interoperability between devices on the platform and a non-compromised end-user experience intermediate/differing power levels of devices also need to be utilized along with leveraging the optional set of components for a specific functionality. Therefore there is an increasing need to find ways to allocate power consumption without sacrificing performance.

Furthermore, with the introduction of new architectures and hot plug capability features for add-in cards/devices, there is a further need for systems to be capable of properly allocating power efficiently to existing devices not in reduced power states and any new device(s) dynamically added to the system. This power allocation should be based on the power resources requested by devices, a prioritized scheme for power allocation and user controlled device/power/performance profiles of operation.

DETAILED DESCRIPTION

A system and method to determine a presence of devices coupled to one or more peripheral buses in a system, and reducing power consumption of a subset of the devices that are present, based on a predetermined power resource budget, is described. In one embodiment, the reducing of the power consumption is performed dynamically by having an agent reduce the power limit in a device register(s) corresponding to the subset of devices. Furthermore, in one embodiment, the power resource budget is based at least in part on a user-selected power/performance level.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
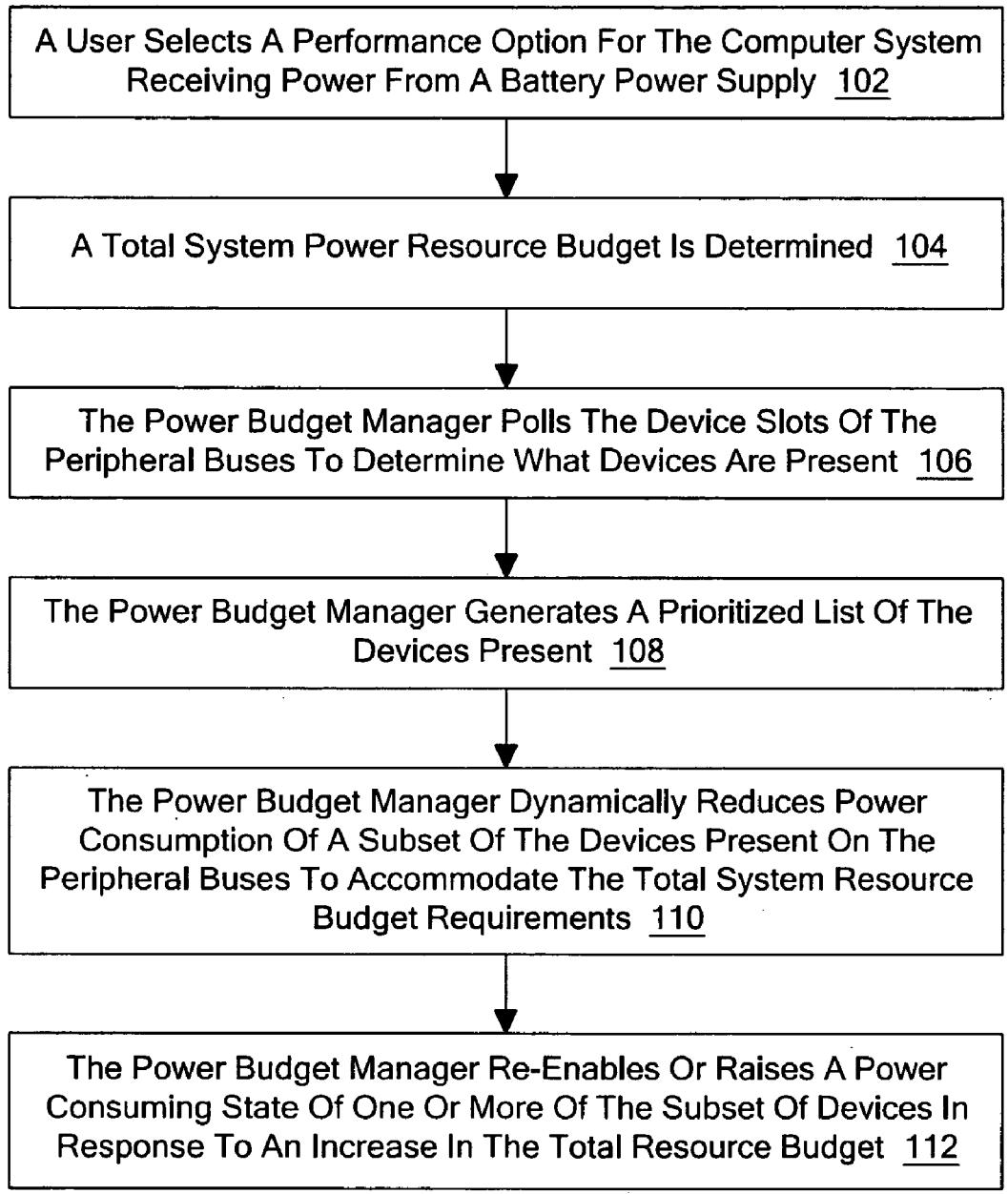
FIG. 1 provides a flow diagram describing the processes of providing power management for a computer system, in accordance with one embodiment.

FIG. 1 provides a flow diagram describing the processes of providing power management for a computer system. In process 102, a user of the computer system is prompted to select a performance option. In an alternative embodiment, the operating system may also boot with a default option that requires no user intervention unless the user wants to change it. In one embodiment, the performance options may include extra performance power, and standard performance and battery life.

In process 104, an operating system or a system firmware determines a total system power resource budget based in part, in one embodiment, on the user's selected performance. In other embodiments, a user's selected performance may not have been obtained. In yet further alternative embodiments, the power resource budget may take into account user application requirements, a processor performance states (e.g., C-states), processor throttling, chipset/memory throttling, bus slot power limits, projected device power consumption limits, memory utilization, etc., when determining the total power resource budget.

In one embodiment, a power budget manager is provided in the system, and is responsible for managing power consumption among device slots on peripheral bus, such as a Peripheral Component Interconnect (PCI) Express bus. In alternative embodiments, the power budget manager may further manage power consumption of other devices within the system, which have power budgeting capability, including devices on buses other than peripheral buses.

In one embodiment, the power budget manager is an agent provided on the computer system, which may include a routine of instructions, which when executed manage power consumption among the device slots, as described herein. The power budget may be executed intermittently, based on interrupts caused with devices that are added or removed from a slot of the peripheral bus or devices that enter/exit lower power hardware device states, in response to a request from the operating system, or some other event.

In process 106, the power budget manager polls the device slots of the peripheral bus to determine what devices are present. In one embodiment, one or more of the device slots provided on the bus is capable of having the power provided to the slot be dynamically controlled. In one embodiment, a device register is provided for one or more of the slots, with the device register identifying the current power limits of the respective slot. By changing the power limits within a device register, the device does not to exceed consumption beyond the programmed power limits and subsequently the power provided to the respective slot on the bus may be reduced or increased by using some other standalone battery/power supply logic on the platform.

Therefore, when the power budget manager determines a device is present within a slot along the peripheral bus, the power budget manager is also able to determine the amount of power to be provided to respective slot, by reading the device register corresponding the device slot.

In process 108, after determining which device slots currently contain devices, the power budget manager generates a prioritized list of the device slots, which currently contain devices. In one embodiment, the device slots may be configured to contain only certain types of devices, and therefore when a device is present within a slot, the power budget manager is aware of the type of device present. Knowing what devices are present, the prioritized list is based in part on the demands of an application being executed (or to be executed), devices associated with a particular application usage, preferences selected by a user of the computer system, and/or pre-configured preferences of the system.

Consider the following scenarios as examples. Assume an application needs a "video card"+"DVD drive". In this case, these two devices would have very high power priority and get the power budget that they request (at the expense of perhaps the USB bus or something that may not be needed by the application).

In a second example, a multi-function MPEG decoder (video) card may have several modes: iDCT only, iDCT+VLD or iDCT+VLD+HWMC. Each mode represents enhanced decode performance but at increased power demand. Conversely, if the video decode device requests 150W (iDCT+VLD+HWMC) but is a lower priority on the user or system power budget profile, it may only get 75W and fall back to only iDCT-only mode.

A DVD drive may be another example. Perhaps the drive needs 15W to read but 25W to burn DVD. Depending on the current application mode (reading vs. burning) the power demand is different. In one embodiment, in a user or system-selected profile, there may be standard profiles like: "enhanced video mode" which optimizes power to the video card at the expense of other devices.

In process 110, based in part on the user selected performance level, the prioritized lists of device slots that currently contain devices, the power budget manager dynamically reduces power consumption of at least a subset of the devices that are present on the peripheral bus to accommodate the total system resource budget requirements as previously determined. In one embodiment, the power budget manager adjusts the power limits of one or more of the slots on the bus, to a disabled a device in a slot or, alternatively, place the device in a low power consuming state.

Thereafter, the power budget manager will continue to manage the power consumption of the devices. In one embodiment, in process 112, the power budget manager will re-enable or raise the power limits of one or more of the subset of devices in response to either an increase in the total resource budget, device exiting a low power state, a preference of the user, completion of an application be executed, or the absence of a need for one of the devices whose power consumption had not been reduced. Furthermore, the power budget manager may reduce the power consumption of other devices on the peripheral bus (whose power consumption had not previously been reduced), while raising the power consumption of one or more of the subset of devices, which had their power consumption reduced.

In one embodiment, the power budget manager may intermittently poll to determine the presences/absences of devices, based on a predetermined time period, or in response to an alert/interrupt generated when a device has been added or removed from one of the peripheral buses. In the case of a device having been added to one of the peripheral buses, the power budget manager needs to responsibly allocate power to a newly added device.

Figure 2:
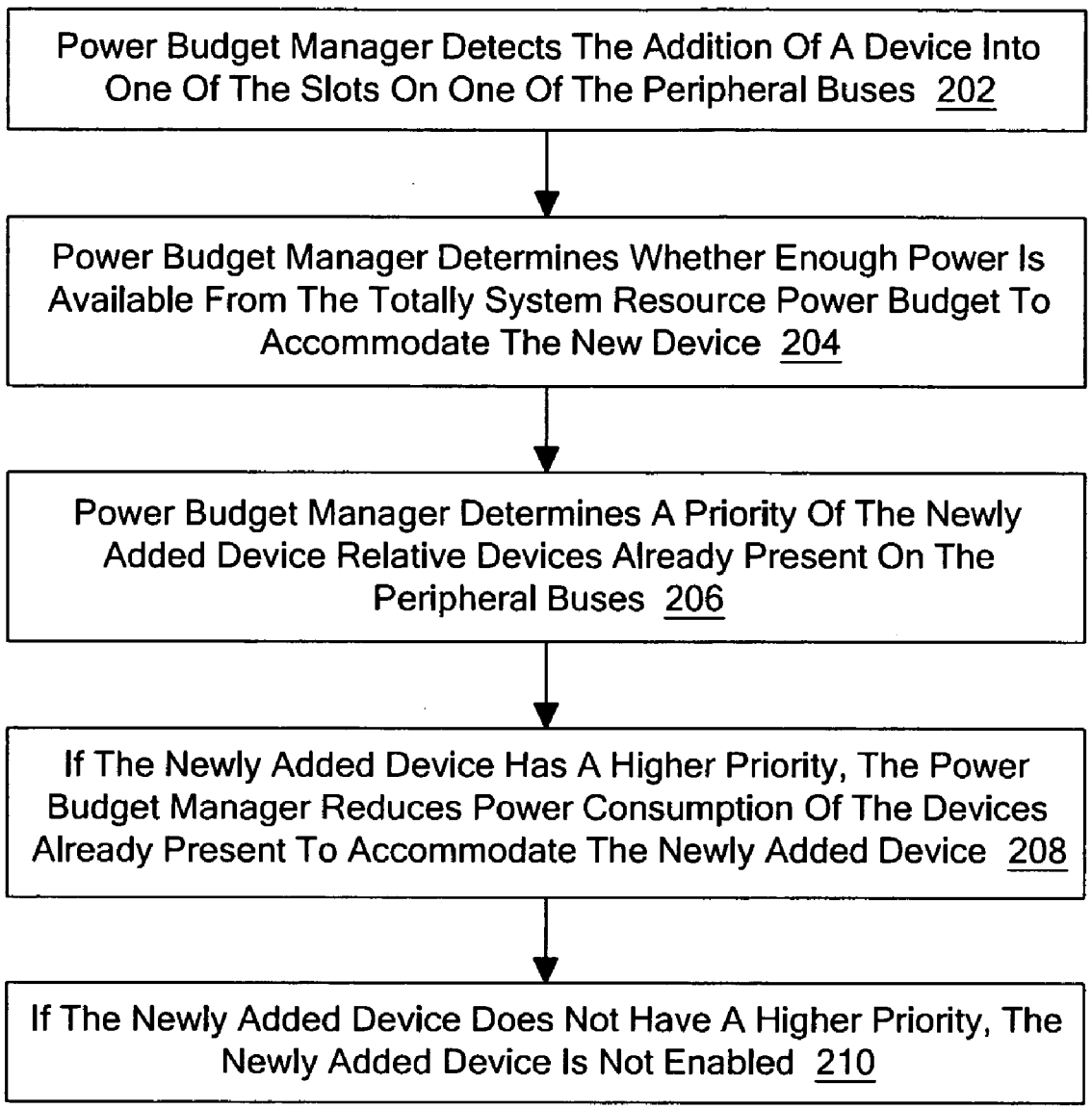
FIG. 2 presents a flow diagram describing a process of managing power consumption of the device slots on the peripheral bus when a new device is added.

FIG. 2, presents a flow diagram describing a process of managing power consumption of the device slots on the peripheral bus when a new device is added. In process 202 the power budget manager detects the addition of a device (e.g., a hot plug capable device) having been plugged into one of the slots on the peripheral bus. After having determined a power limit of the newly added device (based on the slot in which the device has been), in process 204 the power budget manager determines whether enough power is available from the total system resource power budget to accommodate the new device.

If there is not enough power to accommodate the new device, in process 206 the power budget manager determines a priority of the device slot of the newly device, relative to the other device slots already containing devices, as included in the previously generated priority list. If the device slot of the newly added device has a higher priority than one or more device slots currently containing a device, then in process 208 the power budget manager reduces the power limit of one or more of those device slots to accommodate the newly added device before the added device is enabled. If the device slot of the newly added device does not have a priority, then in process 210 the newly added device is not enabled until an application that uses the particular device is launched and there is reallocation in the prioritization of the devices.

Figure 3:
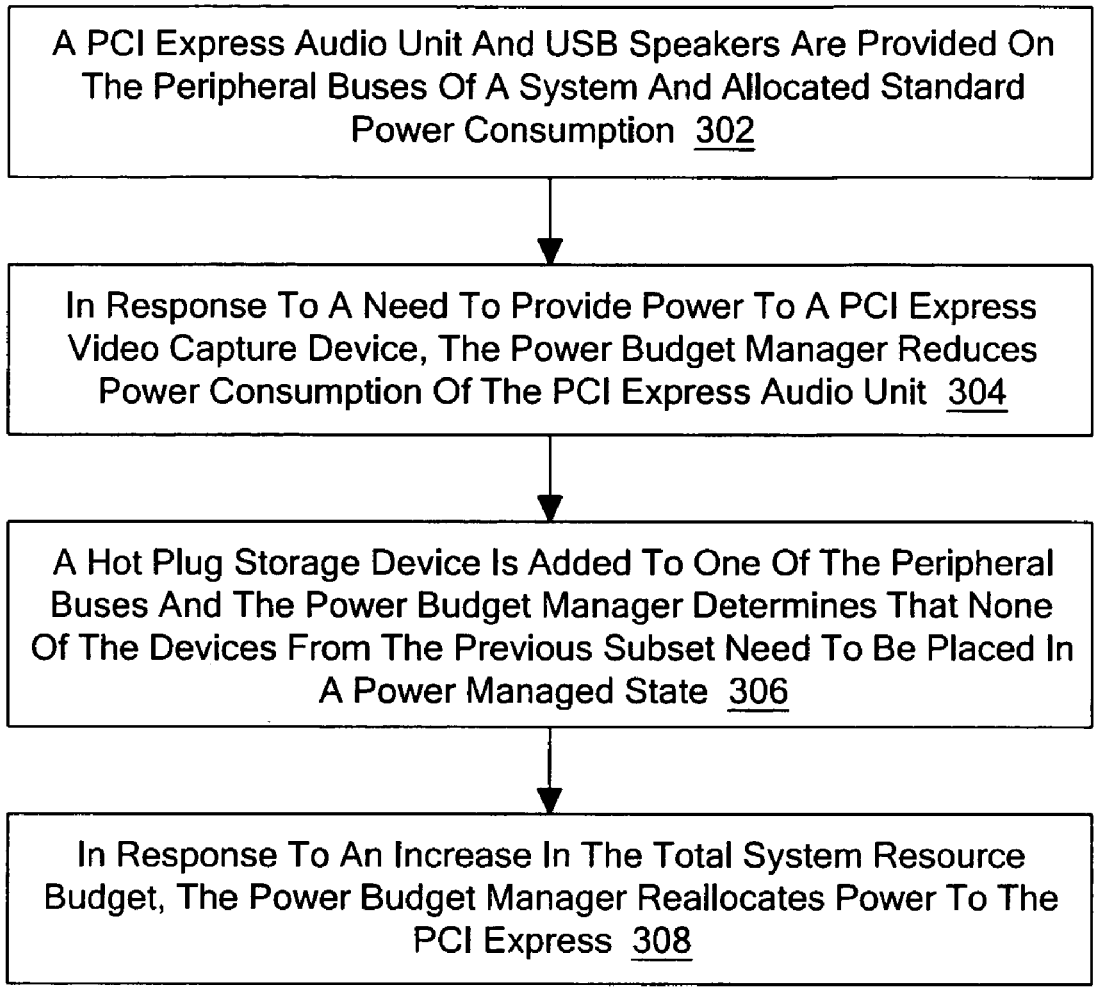
FIG. 3 presents a flow diagram describing an example of the power budget manager managing the power consumption of devices on peripheral buses, in accordance with one embodiment.

FIG. 3 presents a flow diagram describing an example of the power budget manager managing the power consumption of devices on peripheral buses, in accordance with one embodiment. In process 302, at least a PCI Express audio unit and USB speakers are provided on the peripheral buses of a system and allocated standard power consumption.

In process 304, in response to a need to provide power to a PCI Express video capture device, the power budget manager reduces power of the device slot containing the PCI Express audio to accommodate the PCI Express video capture unit. The need to provide power to the video capture may arise by having the video capture unit added to the system, through the need of an application being processed by the computer system, or alternatively by the selected preference of a user of the computer system.

In process 306, a hot plug storage device is added to one of the peripheral buses and the power budget manager determines that none of the devices from the previous subset need to be placed in a power managed state. In process 308, in response to an increase in the total system resource budget, or the completion of an application being executed, the power budget manager reallocates power to the device slot of the PCI Express audio unit.

Figure 4:
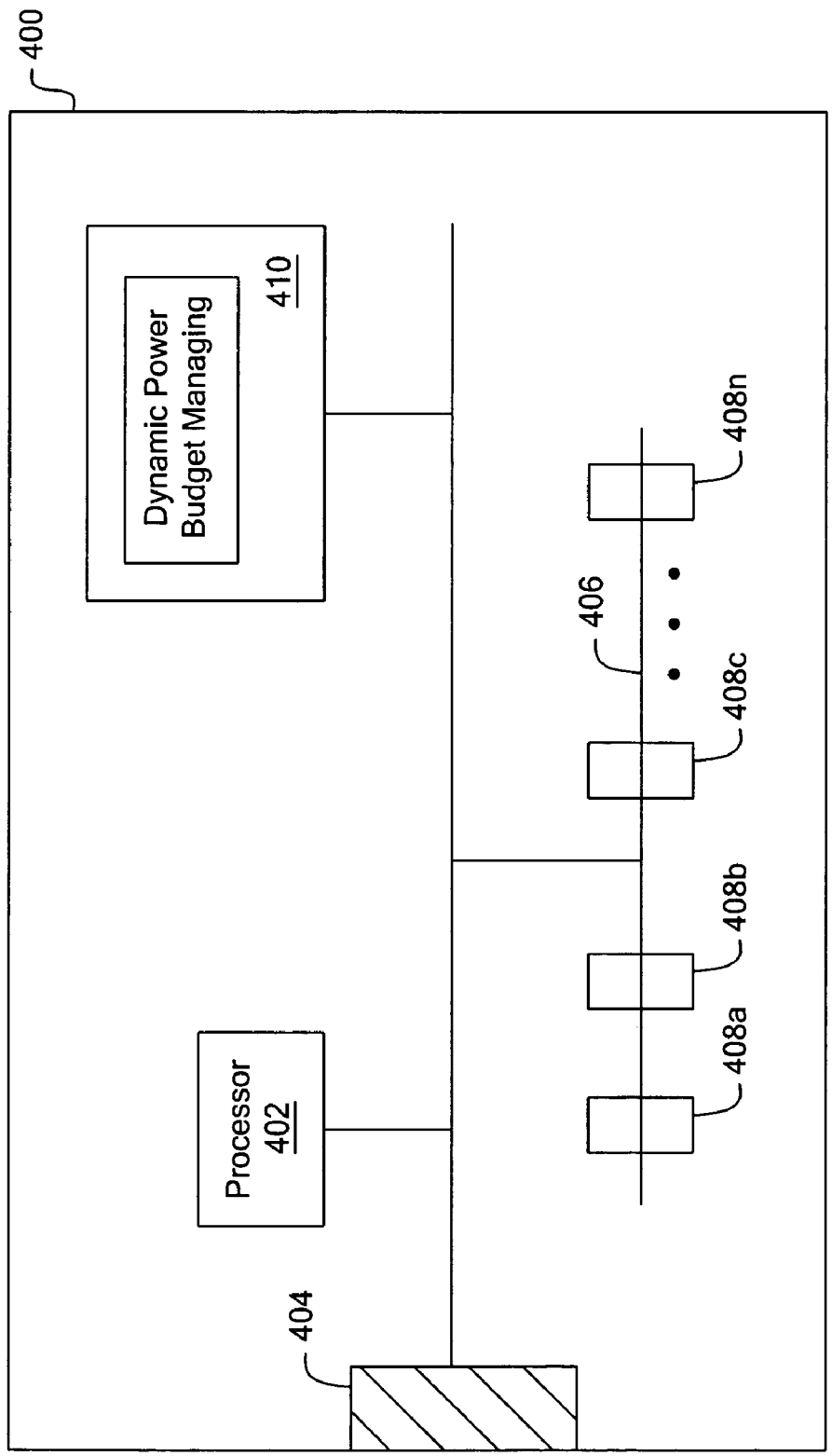
FIG. 4 illustrates a system diagram of a system operable to provide power budget management in accordance with one embodiment.

The processes described above can be stored in a memory of a computer, system, or machine as a set of instructions to be executed by a processor of the computer system or machine. For example, FIG. 4 illustrates a system 400 including a processor 402, a network interface 404, a peripheral bus 406 including multiple device slots 408*a-n*, and a memory 410 having stored therein a set of instructions to provide dynamic power budget managing, in accordance with one embodiment as described herein.

In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

The invention claimed is:

1. A method comprising:
   polling to determine a presence of devices coupled to a peripheral bus in a system;
   after the polling, calculating power requirements of device slots currently containing the devices;
   after calculating power requirements of the device slots currently containing devices, generating a prioritized list of the device slots currently containing devices; and
   dynamically reducing power consumption of a subset of the devices based on a predetermined power resource budget and the prioritized list of the device slots currently containing devices.

2. The method of claim 1, wherein the device slots have corresponding device registers to identify a limit of power to be provided to a respective device slot.

3. The method of claim 1, wherein the dynamically reducing power consumption of the subset includes, a power budget manager agent reducing a power limit in a corresponding device register for each device slot of the subset.

4. The method of claim 3, wherein the predetermined power resource budget is based at least in part on a user selected performance level.

5. The method of claim 4, wherein the power resource budget is based on an application to be executed by the system.

6. The method of claim 5, wherein in response to one of a completion of execution of an application, and removal of a power consuming device, the power budget manager increasing power limits of one or more of the device slots.

7. The method of claim 1, wherein the bus includes at a Peripheral Component Interconnect (PCI) Express bus.

8. The method of claim 1 further comprising in response to detecting a device has been added to the bus, verifying enough power can be provided to a device slot containing the added device, before enabling the device.

9. The method of claim 8, wherein the added device is a hot plug capable device.

10. The method of claim 9, wherein the system is one of a mobile computer system.

11. A machine-readable medium having stored thereon a set of instructions, which when executed, perform a machine-readable medium comprising:
    polling to determine a presence of devices coupled to a peripheral bus in a system;
    after the polling, calculating power requirements of device slots currently containing the devices;
    after calculating power requirements of the device slots currently containing devices, generating a prioritized list of the device slots currently containing devices; and
    dynamically reducing power consumption of a subset of the devices based on a predetermined power resource budget and the prioritized list of the device slots currently containing devices.

12. The machine-readable medium of claim 11, including additional instructions, when executed, perform the method further comprising, after the polling, calculating power requirements of device slots currently containing the devices.

13. The machine-readable medium of claim 12, wherein the device slots have corresponding device registers to identify a limit of power to be provided to a respective device slot.

14. The machine-readable medium of claim 12, wherein the bus includes at a Peripheral Component Interconnect (PCI) Express bus.

15. The machine-readable medium of claim 12, including additional instructions, when executed, perform the method further comprising, after calculating power requirements of the device slots currently containing devices, generating a prioritized list of the device slots currently containing devices.

16. The machine-readable medium of claim 12, including additional instructions, when executed, perform the method further comprising, in response to detecting a device has been added to the bus, verifying enough power can be provided to a device slot containing the added device, before enabling the device.

17. The machine-readable medium of claim 11, wherein the dynamically reducing power consumption of the subset includes, a power budget manager agent reducing a power limit in a corresponding device register for each device slot of the subset.

18. The machine-readable medium of claim 17, wherein the predetermined power resource budget is based at least in part on a user selected performance level.

19. A system comprising:
    A processor,
    a network interface coupled to the processor; and
    a machine-readable medium having stored thereon a set of instructions which when executed cause a system to perform a method comprising:
    polling to determine a presence of devices coupled to a peripheral bus in a system;
    after the polling, calculating power requirements of device slots currently containing the devices;
    after calculating power requirements of the device slots currently containing devices, generating a prioritized list of the device slots currently containing devices; and
    dynamically reducing power consumption of a subset of the devices based on a predetermined power resource budget and the prioritized list of the device slots currently containing devices.

20. The system of claim 19, wherein the machine-readable medium includes additional instructions, which when executed, perform the method further comprising, the dynamically reducing power consumption of the subset includes, a power budget manager agent reducing a power limit in a corresponding device register for each device slot of the subset.

21. The system of claim 20, wherein the power resource budget is based on an application to be executed by the system.

22. The system of claim 21, wherein the machine-readable medium includes additional instructions, which when executed, perform the method further comprising, in response to one of a completion of execution of an application, and removal of a power consuming device, the power budget manager increasing power limits of one or more of the device slots.

23. A method comprising:
- calculating power requirements of device slots on a Peripheral Component Interconnect (PCI) Express bus that currently contain devices;
- after calculating power requirements of the device slots currently containing devices, generating a prioritized list of the device slots currently containing devices; and
- reducing a power limit in corresponding device registers for a subset of the device slots currently containing devices, based on a predetermined power resource budget and the prioritized list of the device slots currently containing devices.

24. The method of claim 23, further comprising generating a prioritized list of the device slots currently containing devices, based on at least one of an application being executed, an application to be executed, a preference selected by a user of a computer system, and a pre-configured preference of the system.

25. The method of claim 23, further comprising, in response to one of a completion of execution of an application, and removal of a power consuming device, increasing power limits of one or more of the device slots.

26. A system comprising:
- A processor,
- a network interface coupled to the processor; and
- a machine-readable medium having stored thereon a set of instructions which when executed cause a system to perform a method comprising:
  - calculating power requirements of device slots on a Peripheral Component Interconnect (PCI) Express bus that currently contain devices;
  - after calculating power requirements of the device slots currently containing devices, generating a prioritized list of the device slots currently containing devices; and
  - reducing a power limit in corresponding device registers for a subset of the device slots currently containing devices, based on a predetermined power resource budget and the prioritized list of the device slots currently containing devices.

27. The system of claim 26, wherein the machine-readable medium includes additional instructions, which when executed, perform the method further comprising, generating a prioritized list of the device slots currently containing devices, based on at least one of an application being executed, an application to be executed, a preference selected by a user of a computer system, and a pre-configured preference of the system.

28. The system of claim 26, wherein the machine-readable medium includes additional instructions, which when executed, perform the method further comprising, in response to one of a completion of execution of an application, and removal of a power consuming device, increasing power limits of one or more of the device slots.

* * * * *